United States Patent
Kamakura

(10) Patent No.: US 12,523,185 B2
(45) Date of Patent: Jan. 13, 2026

(54) POWER DETERMINATION APPARATUS AND POWER DETERMINATION METHOD

(71) Applicant: ISUZU MOTORS LIMITED, Yokohama (JP)

(72) Inventor: Sei Kamakura, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 119 days.

(21) Appl. No.: 18/409,515

(22) Filed: Jan. 10, 2024

(65) Prior Publication Data
US 2024/0263595 A1 Aug. 8, 2024

(30) Foreign Application Priority Data
Feb. 7, 2023 (JP) .................................. 2023-016872

(51) Int. Cl.
*F02D 41/24* (2006.01)
*B60W 10/06* (2006.01)
(Continued)

(52) U.S. Cl.
CPC ......... *F02D 41/2467* (2013.01); *B60W 10/06* (2013.01); *B60W 10/08* (2013.01);
(Continued)

(58) Field of Classification Search
CPC .............. F02D 41/2467; F02D 41/38; F02D 2200/0404; F02D 2200/0611; F02D 2200/101; F02D 41/10; F02D 43/04; F02D 2200/602; F02D 2250/18; F02D 41/0007; B60W 10/06; B60W 10/08; B60W 20/16; B60W 2050/0026; B60W 20/11; B60W 2510/0614; B60W 2510/0623; B60W 2510/0633; B60W 2510/0638; B60W 2510/083; B60W 2540/10; B60W 2710/0616; B60W 2710/0627; B60W 2710/0638; B60W 2710/0666;
(Continued)

(56) References Cited

U.S. PATENT DOCUMENTS

2018/0162350 A1* 6/2018 Kim ........................ F02D 41/00

FOREIGN PATENT DOCUMENTS

DE 10 2015 201 905 A1 8/2016
DE 10 2015 204 093 A1 9/2016
(Continued)

*Primary Examiner* — Brian P Sweeney
(74) *Attorney, Agent, or Firm* — PROCOPIO, CORY, HARGREAVES & SAVITCH LLP

(57) ABSTRACT

A power determination apparatus includes a determination part that determines a first injection correction amount of a fuel injection quantity of an engine and a first torque correction amount of motor torque generated by a motor, a specification part that specifies a correction coefficient for correcting the first injection correction amount and the first torque correction amount, and a calculation part that calculates i) a corrected injection quantity obtained by subtracting a second injection correction amount, which is the first injection correction amount multiplied by the correction coefficient, from the fuel injection quantity and ii) a corrected torque obtained by adding a second torque correction amount, which is the first torque correction amount multiplied by the correction coefficient, to the motor torque.

11 Claims, 4 Drawing Sheets

(51) Int. Cl.
*B60W 10/08* (2006.01)
*B60W 20/16* (2016.01)
*F02D 41/38* (2006.01)

(52) U.S. Cl.
CPC ............. *B60W 20/16* (2016.01); *F02D 41/38* (2013.01); *F02D 2200/0404* (2013.01); *F02D 2200/0611* (2013.01); *F02D 2200/101* (2013.01)

(58) Field of Classification Search
CPC ....... B60W 2710/083; B60Y 2400/435; B60Y 2400/442; B60K 6/24; B60K 6/48; Y02T 10/12
See application file for complete search history.

(56) References Cited

FOREIGN PATENT DOCUMENTS

| | | | |
|---|---|---|---|
| JP | 2004092456 A | * | 3/2004 |
| JP | 2010-090723 A | | 4/2010 |
| JP | 2011-051383 A | | 3/2011 |
| JP | 2011-051542 A | | 3/2011 |
| JP | 2015-051743 A | | 3/2015 |
| JP | 2019-166943 A | | 10/2019 |

* cited by examiner

POWER DETERMINATION APPARATUS AND POWER DETERMINATION METHOD

CROSS-REFERENCE TO RELATED APPLICATIONS

The present application claims priority to Japanese Patent Application number 2023-016872, filed on Feb. 7, 2023, contents of which are incorporated herein by reference in its entirety.

BACKGROUND OF THE INVENTION

The present disclosure relates to a power determination apparatus and a power determination method.

A conventional controller for a hybrid vehicle causes an engine and a motor to generate torque to suppress an increase in fuel consumed by an engine, if torque corresponding to a stepping operation of an accelerator is larger than a predetermined torque (for example, Japanese Unexamined Patent Application Publication No. 2011-51542).

A conventional controller for a hybrid vehicle increases an amount of air intake into an engine and boost pressure of a turbocharger installed in an engine when an accelerator is stepped on. Further, a measure can be adopted to suppress a delay in an increase in an amount of air intake into an engine and in boost pressure of a turbocharger, which is, for example, reducing a valve opening degree of Exhaust Gas Recirculation (EGR), but this causes a problem of increasing an amount of nitrogen oxide (NOx) emissions.

BRIEF SUMMARY OF THE INVENTION

The present disclosure focuses on this point, and an object thereof is to generate desired torque while suppressing the amount of NOx emissions.

Means for Solving the Problems

A power determination apparatus according to a first aspect of the present disclosure includes a determination part that determines a first injection correction amount of a fuel injection quantity of an engine and a first torque correction amount of motor torque generated by a motor, on the basis of an accelerator opening degree and an engine speed, a specification part that specifies a correction coefficient for correcting the first injection correction amount and the first torque correction amount on the basis of i) a difference between an actual boost pressure of a turbocharger and a required boost pressure, which is a boost pressure required for generating torque corresponding to the accelerator opening degree and ii) the engine speed, and a calculation part that calculates i) a corrected injection quantity obtained by subtracting a second injection correction amount, which is the first injection correction amount multiplied by the correction coefficient, from the fuel injection quantity and ii) a corrected torque obtained by adding a second torque correction amount, which is the first torque correction amount multiplied by the correction coefficient, to the motor torque.

A power determination method according to a second aspect of the present disclosure includes determining a first injection correction amount of a fuel injection quantity of an engine (2) and a first torque correction amount of motor torque, on the basis of an accelerator opening degree and an engine speed, specifying a correction coefficient for correcting the first injection correction amount and the first torque correction amount on the basis of i) a difference between an actual boost pressure of a turbocharger and a required boost pressure, which is a boost pressure required for generating torque corresponding to the accelerator opening degree, and ii) the engine speed, and calculating i) a corrected injection quantity obtained by subtracting a second injection correction amount, which is the first injection correction amount multiplied by the correction coefficient, from the fuel injection quantity and ii) a corrected torque obtained by adding a second torque correction amount, which is the first torque correction amount multiplied by the correction coefficient, to the motor torque.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

<Overview of Power Determination Apparatus 10>

Figure 1:
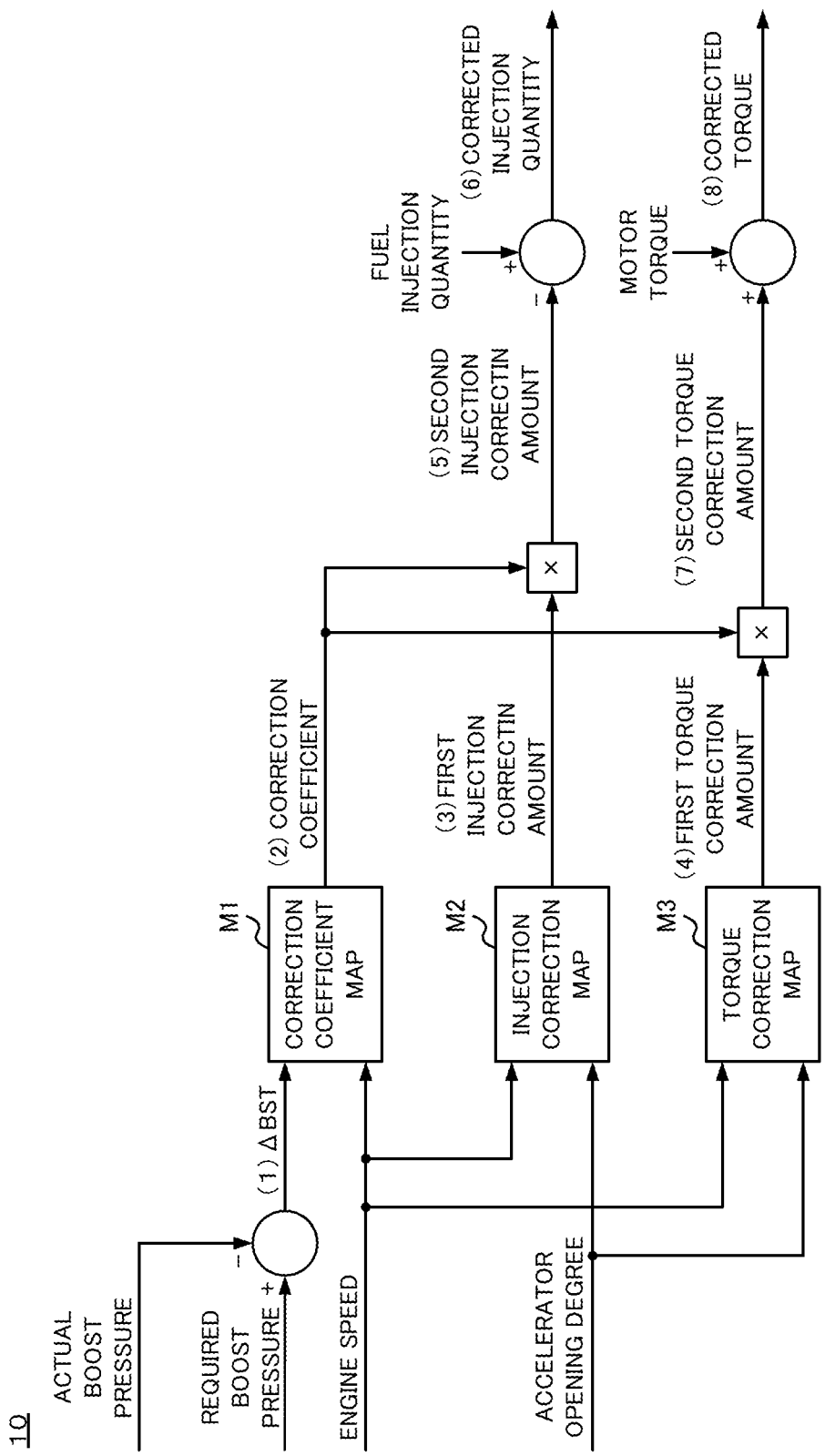
FIG. 1 illustrates an overview of a power determination apparatus 10 according to the present embodiment.

FIG. 1 illustrates an overview of a power determination apparatus 10 according to the present embodiment. The power determination apparatus 10 is installed in a hybrid vehicle (hereinafter referred to as a "vehicle"), and has a function of determining a fuel injection quantity of an engine and a torque generated by a motor (hereinafter referred to as a "motor torque"). Further, when an accelerator is stepped on, the power determination apparatus 10 determines a corrected injection quantity obtained by correcting the fuel injection quantity and a corrected torque obtained by correcting the motor torque, causes the engine to inject fuel at the corrected injection quantity, and causes the motor to generate the corrected torque. It should be noted that, "stepping on an accelerator" in the present embodiment indicates either a driver stepping on an accelerator pedal to accelerate a vehicle, or an automatic driving control apparatus (not shown in figures) of a vehicle during automatic driving outputting an accelerator opening degree determined to accelerate the vehicle to the power determination apparatus 10.

The operation for determining the corrected injection quantity and the corrected torque will be described below.

First, the power determination apparatus 10 calculates "$\Delta BST$," which is a difference between an actual boost pressure of a turbocharger and a boost pressure required for generating torque corresponding to an accelerator opening degree (hereinafter referred to as "required boost pressure") ((1) shown in FIG. 1). The power determination apparatus 10 specifies a correction coefficient corresponding to the calculated $\Delta BST$ and an engine speed, by referencing a correction coefficient map M1 ((2) shown in FIG. 1).

The power determination apparatus 10 determines a first injection correction amount corresponding to the engine speed and the accelerator opening degree, by referencing an injection correction map M2 ((3) shown in FIG. 1). The power determination apparatus 10 determines a first torque correction amount corresponding to the engine speed and the accelerator opening degree, by referencing a torque correction map M3 ((4) shown in FIG. 1).

Subsequently, the power determination apparatus 10 calculates a second injection correction amount, which is the first injection correction amount multiplied by the correction coefficient ((5) shown in FIG. 1), and calculates the corrected injection quantity obtained by subtracting the second injection correction amount from the fuel injection quantity corresponding to the accelerator opening degree ((6) shown in FIG. 1). The power determination apparatus 10 calculates a second torque correction amount, which is the first torque correction amount multiplied by the correction coefficient ((7) shown in FIG. 1), and calculates the corrected torque obtained by adding the second torque correction amount to the motor torque corresponding to the accelerator opening degree ((8) shown in FIG. 1).

When the vehicle travels at an acceleration corresponding to an accelerator stepping amount (so-called rapid acceleration) due to the accelerator being stepped on, the vehicle may employ a measure of reducing a valve opening degree of the EGR to suppress a delay in the increase in an amount of air intake into the engine and in the boost pressure of the turbocharger. However, reducing the valve opening degree of the EGR increases an amount of NOx emissions.

Therefore, the power determination apparatus 10 determines the corrected injection quantity, obtained by subtracting the second injection correction amount from the fuel injection quantity corresponding to the accelerator opening degree, and the corrected torque, obtained by adding the second torque correction amount to the motor torque corresponding to the accelerator opening degree. The power determination apparatus 10 operates in this manner to reduce the fuel injection quantity and increase the motor torque when the accelerator is stepped on, and so the fuel injection quantity can be reduced while the vehicle is driven at an acceleration corresponding to the accelerator stepping amount. As a result, it becomes easier to allow the delay in the increase in the amount of the air intake into the engine and in the boost pressure of the turbocharger, and therefore the EGR valve opening degree can be increased to suppress the amount of the NOx emissions.

The configuration and operation of the power determination apparatus 10 will be described in detail below.

<Configuration of Power Determination Apparatus 10>

Figure 2:
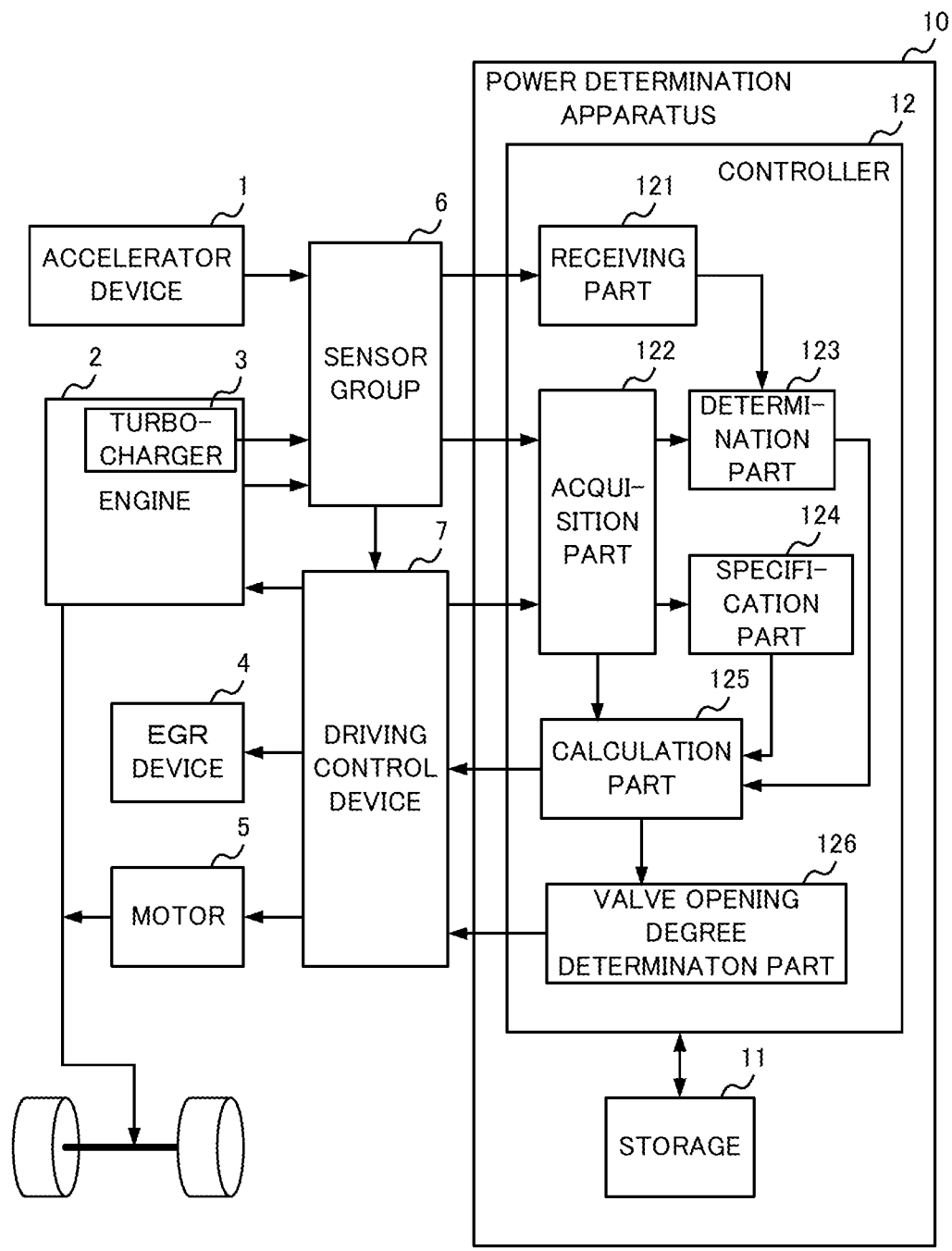
FIG. 2 shows a configuration of the power determination apparatus 10.

FIG. 2 shows configurations of the vehicle and the power determination apparatus 10 included in the vehicle. The vehicle shown in FIG. 2 includes an accelerator device 1, an engine 2, a turbocharger 3, an EGR device 4, a motor 5, a sensor group 6, a driving control device 7, and a power determination apparatus 10. The power determination apparatus 10 includes a storage 11 and a controller 12.

The accelerator device 1 is a device for controlling acceleration of the vehicle. The accelerator device 1 includes an accelerator pedal, and outputs an accelerator opening degree corresponding to an amount that a driver of the vehicle steps on the accelerator pedal. When the vehicle is driven automatically, the accelerator device 1 outputs an accelerator opening degree corresponding to torque required by the automatic driving control apparatus included in the vehicle. The engine 2 is a power source for driving the vehicle. The turbocharger 3 compresses intake air flowing through an intake passage (not shown in figures) upstream of the engine 2, for example, by using a flow of exhaust air flowing through an exhaust passage (not shown in figures) downstream of the engine 2. The EGR device 4 includes a valve that can be opened and closed in an EGR passage, and the valve opening degree is controlled by the driving control device 7 to adjust an EGR gas amount. The motor 5 is a power source for driving the vehicle.

The sensor group 6 includes a plurality of sensors such as an accelerator opening degree sensor, an engine speed sensor, and a boost pressure sensor. The driving control device 7 is a device including a processor such as an Electronic Control Unit (ECU), and causes the processor to execute a program stored in a storage of the driving control device 7 to drive the vehicle equipped with the power determination apparatus 10. The driving control device 7 controls the motor 5 to generate the motor torque determined by the power determination apparatus 10, and controls the engine 2 to inject the fuel at the fuel injection quantity determined by the power determination apparatus 10. As will be described later, if the boost pressure of the turbocharger 3 is smaller than the boost pressure required for generating the torque corresponding to the accelerator opening degree, the driving control device 7 controls the motor 5 with a torque greater than the motor torque corresponding to the accelerator opening degree and controls the engine 2 to inject the fuel at a fuel injection quantity smaller than the fuel injection quantity corresponding to the accelerator opening degree.

The storage 11 includes a storage medium such as a Read Only Memory (ROM), a Random Access Memory (RAM), a Hard Disk Drive (HDD), or a Solid State Drive (SSD). The storage 11 stores a program executed by the controller 12. The storage 11 stores various types of information for determining the corrected injection quantity and the corrected torque. For example, the storage 11 stores the correction coefficient map M1 (FIG. 1) showing the correction coefficients corresponding to the engine speed and $\Delta BST$, the injection correction map M2 (FIG. 1) showing the first injection correction amounts corresponding to the engine speed and the accelerator opening degree, and the torque correction map M3 (FIG. 1) showing the first torque correction amounts corresponding to the engine speed and the accelerator opening degree.

The controller 12 is, for example, a processor such as a Central Processing Unit (CPU) or an Electronic Control Unit (ECU). The controller 12 functions as a receiving part 121, an acquisition part 122, a determination part 123, a specification part 124, a calculation part 125, and a valve opening degree determination part 126, by executing the program stored in the storage 11. It should be noted that the controller 12 may be formed of a single processor, or may be formed of a plurality of processors or a combination of one or more processors and an electronic circuit. The configuration of each unit implemented by the controller 12 will be described below.

The receiving part 121 receives the accelerator opening degree detected by the accelerator opening degree sensor. The acquisition part 122 acquires the engine speed, the fuel injection quantity of the engine 2, the actual boost pressure, the required boost pressure, and the motor torque.

For example, the acquisition part 122 acquires the engine speed detected by the engine speed sensor and the actual boost pressure detected by the boost pressure sensor from the sensor group 6. The acquisition part 122 acquires, from the driving control device 7, i) the fuel injection quantity (hereinafter sometimes referred to as a "injection quantity request value") and motor torque corresponding to the accelerator opening degree and ii) the required boost pressure corresponding to the engine speed and the injection quantity request value, identified by the driving control device 7. The fuel injection quantity corresponding to the accelerator opening degree is the fuel injection quantity corresponding to the torque of the engine 2 within the torque corresponding to the accelerator opening degree, and the motor torque corresponding to the accelerator opening degree is the torque generated by the motor 5 within the torque corresponding to the accelerator opening degree.

The determination part 123 determines the first injection correction amount of the fuel injection quantity on the basis of the engine speed and the accelerator opening degree. Specifically, the determination part 123 first acquires the injection correction map M2 stored in the storage 11. The storage 11 stores the injection correction map M2, which is shown as a plane in two-dimensional space having an axis corresponding to the accelerator opening degree and an axis corresponding to the engine speed and shows a plurality of injection correction amounts associated with the accelerator opening degree and the engine speed. The injection correction amount is a value determined by experiment or simulation. Subsequently, the determination part 123 specifies the injection correction amount associated with the accelerator opening degree received by the receiving part 121 and the engine speed acquired by the acquisition part 122, among the plurality of injection correction amounts included in the injection correction map M2, and determines the specified injection correction amount as the first injection correction amount.

The determination part 123 determines the first torque correction amount of the motor torque on the basis of the engine speed and the accelerator opening degree. Specifically, the determination part 123 first acquires the torque correction map M3 stored in the storage 11. The storage 11 stores the torque correction map M3, which is shown as a plane in two-dimensional space having an axis corresponding to the accelerator opening degree and an axis corresponding to the engine speed and shows a plurality of torque correction amounts associated with the accelerator opening degree and the engine speed. The torque correction amount is a value determined by experiment or simulation. Subsequently, the determination part 123 specifies the torque correction amount associated with the accelerator opening degree received by the receiving part 121 and the engine speed acquired by the acquisition part 122, among the plurality of torque correction amounts included in the torque correction map M3, and determines the specified torque correction amount as the first torque correction amount.

The specification part 124 specifies the correction coefficient for correcting the first injection correction amount and the first torque correction amount on the basis of ΔBST and the engine speed. Specifically, the specification part 124 first acquires the correction coefficient map M1 stored in the storage 11. The storage 11 stores the correction coefficient map M1, which is shown as a plane in two-dimensional space having an axis corresponding to ΔBST and an axis corresponding to the engine speed and shows a plurality of correction coefficients associated with A BST and the engine speed. The correction coefficient is a value determined by experiment or simulation. Subsequently, the specification part 124 specifies the correction coefficient associated with i) the difference (that is, ΔBST) between the actual boost pressure and the required boost pressure and ii) the engine speed, which are acquired by the acquisition part 122, among the plurality of correction coefficients included in the correction coefficient map M1.

The calculation part 125 calculates i) the corrected injection quantity obtained by subtracting the second injection correction amount, which is the first injection correction amount multiplied by the correction coefficient, from the fuel injection quantity and ii) the corrected torque obtained by adding the second torque correction amount, which is the first torque correction amount multiplied by the correction coefficient, to the motor torque. The calculation part 125 outputs the calculated corrected injection quantity and corrected torque to the driving control device 7. The calculation part 125 calculates a corrected injection quantity smaller than the fuel injection quantity corresponding to the accelerator opening degree, and calculates a corrected torque larger than the motor torque corresponding to the accelerator opening degree, for example.

Figure 3:
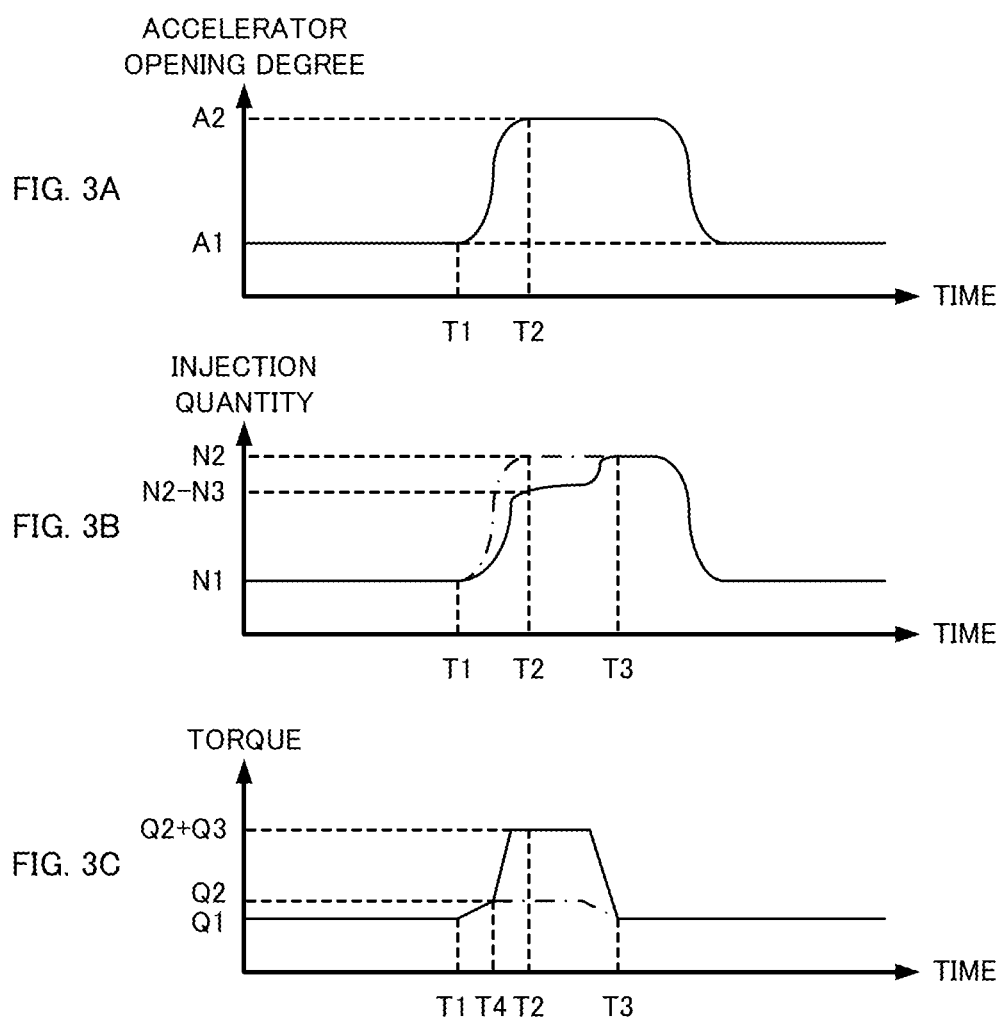
FIG. 3A shows the accelerator opening degree received by the receiving part 121.
FIG. 3B shows the fuel injection quantity of the engine 2.
FIG. 3C shows the motor torque.

FIGS. 3A, 3B, and 3C illustrate the corrected injection quantity and the corrected torque. FIG. 3A shows the accelerator opening degree received by the receiving part 121, FIG. 3B shows the fuel injection quantity of the engine 2, and FIG. 3C shows the motor torque. The horizontal axis in each of FIGS. 3A to 3C represents time, the vertical axis in FIG. 3A represents the accelerator opening degree, the vertical axis in FIG. 3B represents the injection quantity, and the vertical axis in FIG. 3C represents the torque. From a time T1 to a time T3 in FIG. 3B, a single-dotted line represents the fuel injection quantity corresponding to the accelerator opening degree, and a solid line represents the corrected injection quantity. From a time T4 to a time T3 in FIG. 3C, the single-dotted line represents the motor torque corresponding to the accelerator opening degree, and the solid line represents the corrected torque.

As shown in FIG. 3A, the accelerator opening degree received by the receiving part 121 changes from an accelerator opening degree A1 to an accelerator opening degree A2 from the time T1 to a time T2, and is maintained at the accelerator opening degree A2 for a certain period of time after the time T2. Subsequently, as shown in FIG. 3B, at the time T2, the calculation part 125 calculates a corrected injection quantity "N2–N3" obtained by subtracting a second injection correction amount N3 from a fuel injection quantity N2 corresponding to the accelerator opening degree A2. Further, as shown in FIG. 3C, the calculation part 125 calculates a corrected torque "Q2+Q3" obtained by adding a second torque correction amount Q3 to a motor torque Q2 corresponding to the accelerator opening degree A2, during a period from the time T4 to the time T2. The driving control device 7 causes the engine 2 to inject the fuel at the corrected injection quantity "N2–N3" calculated by the calculation part 125 as the fuel injection quantity, and causes the motor 5 to generate the corrected torque "Q2+Q3" as the motor torque.

The calculation part 125 operates as described above to cause the motor 5 to generate the corrected torque that is larger than the motor torque corresponding to the accelerator opening degree, and therefore the engine 2 can inject the fuel at the corrected injection quantity smaller than the fuel injection quantity corresponding to the accelerator opening degree. As a result, it becomes easier to allow the delay in the increase in the amount of the air intake to the engine 2 and in the boost pressure of the turbocharger 3, and therefore the valve opening degree of the EGR can be increased to suppress the amount of the NOx emissions. In addition, reduction of the fuel injection quantity can also suppress an amount of PM (particulate matter) and HC (hydrocarbons) emissions.

Referring back to FIG. 2, the valve opening degree determination part 126 determines the valve opening degree of the EGR device 4 for recirculating exhaust gas of the engine 2 according to the boost pressure corresponding to the second injection correction amount. For example, the valve opening degree determination part 126 sets the valve opening degree corresponding to the required boost pressure as a minimum value, and increases the valve opening degree as the second injection correction amount increases. The valve opening degree determination part 126 may determine the valve opening degree corresponding to the second injection correction amount, by referencing a valve opening degree map stored in the storage 11, which shows the valve opening degrees corresponding to the second injection correction amount and the required boost pressure.

<Processing Sequence in Power Determination Apparatus 10>

Figure 4:
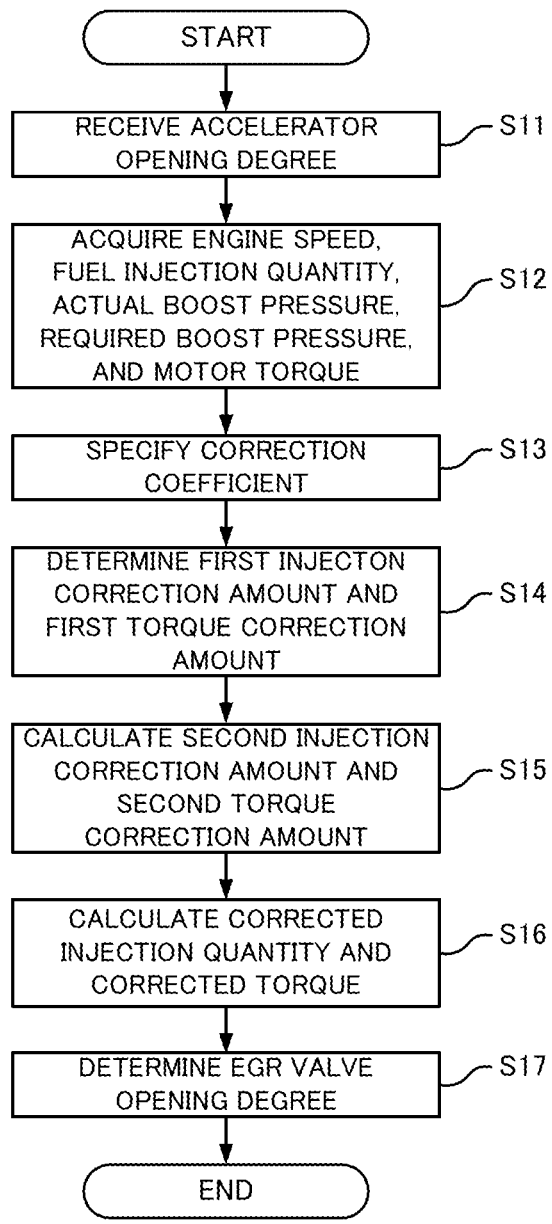
FIG. 4 is an example of a processing sequence in the power determination apparatus 10.

FIG. 4 is an example of a processing sequence in the power determination apparatus 10. The processing sequence shown in FIG. 4 shows operations of i) the calculation part 125 calculating the corrected injection quantity and the corrected torque and ii) the valve opening degree determination part 126 determining the valve opening degree of the EGR device 4. The power determination apparatus 10 repeats the processing sequence shown in FIG. 4 at regular intervals.

First, the receiving part 121 receives the accelerator opening degree detected by the accelerator opening degree sensor (S11). The acquisition part 122 acquires the engine speed, the fuel injection quantity, the actual boost pressure, the required boost pressure, and the motor torque from the sensor group 6 and the driving control device 7 (S12). For example, the acquisition part 122 acquires the engine speed detected by the engine speed sensor included in the sensor group 6 and the actual boost pressure detected by the boost pressure sensor included in the sensor group 6. The acquisition part 122 acquires the fuel injection quantity corresponding to the accelerator opening degree, the motor torque corresponding to the accelerator opening degree, and the required boost pressure, from the driving control device 7.

The specification part 124 specifies the correction coefficient corresponding to i) the difference (that is, ΔBST) between the actual boost pressure and the required boost pressure and ii) the engine speed, by referencing the correction coefficient map M1 stored in the storage 11 (S13).

The determination part 123 determines the first injection correction amount of the fuel injection quantity and the first torque correction amount of the motor torque, on the basis of the accelerator opening degree and the engine speed (S14). For example, the determination part 123 determines the first injection correction amount corresponding to the accelerator opening degree and the engine speed, by referencing the injection correction map M2 stored in the storage 11. Further, the determination part 123 determines the first torque correction amount corresponding to the accelerator opening degree and the engine speed, by referencing the torque correction map M3 stored in the storage 11.

The calculation part 125 calculates the second injection correction amount, which is the first injection correction amount multiplied by the correction coefficient, and the second torque correction amount, which is the first torque correction amount multiplied by said correction coefficient (S15). The calculation part 125 calculates the corrected injection quantity obtained by subtracting the second injection correction amount from the fuel injection quantity acquired by the acquisition part 122 and the corrected torque obtained by adding the second torque correction amount to the motor torque acquired by the acquisition part 122 (S16). The valve opening degree determination part 126 determines the valve opening degree of the EGR device 4 (S17). The valve opening degree determination part 126 determines the valve opening degree corresponding to the second injection correction amount, for example, by referencing a valve opening degree map stored in the storage 11.

<Variation>

In the above description, the operation of calculating the second injection correction amount and the second torque correction amount by the calculation part 125 using one correction coefficient specified by the specification part 124 was described, but the present disclosure is not limited thereto. In the power determination apparatus 10, the second injection correction amount and the second torque correction amount may be calculated using an injection correction coefficient for correcting the first injection correction amount and a torque correction coefficient for correcting the first torque correction amount.

The specification part 124 specifies, as the correction coefficients, an injection correction coefficient and a torque correction coefficient that is different from the injection correction coefficient. For example, the specification part 124 specifies the injection correction coefficient by referencing the injection correction coefficient map showing the injection correction coefficient corresponding to ΔBST and the engine speed, stored in the storage 11. The specification part 124 specifies the torque correction coefficient by referencing the torque correction coefficient map showing the torque correction coefficient corresponding to ΔBST and the engine speed, stored in the storage 11.

The calculation part 125 calculates i) the corrected injection quantity obtained by subtracting the second injection correction amount, which is the first injection correction amount multiplied by the injection correction coefficient, from the fuel injection quantity and ii) the corrected torque obtained by adding the second torque correction amount, which is the first torque correction amount multiplied by the torque correction coefficient, to the motor torque. The above operations of the specification part 124 and the calculation part 125 allow the value of the injection correction coefficient and the value of the torque correction coefficient to be respectively determined, which facilitates creation of the correction coefficient map showing the correction coefficients. As a result, time required for experiment or simulation to create the correction coefficient map can be reduced.

<Effect of the Power Determination Apparatus 10>

As described above, the power determination apparatus 10 includes the determination part 123 that determines the first injection correction amount of the fuel injection quantity and the first torque correction amount of the motor torque on the basis of the accelerator opening degree and the engine speed, the specification part 124 that specifies the correction coefficient for correcting the first injection correction amount and the first torque correction amount on the basis of i) the difference between the actual boost pressure and the required boost pressure and ii) the engine speed, and the calculation part 125 that calculates i) the corrected injection quantity obtained by subtracting the second injection correction amount, which is the first injection correction amount multiplied by the correction coefficient, from the fuel injection quantity and ii) the corrected torque obtained by adding the second torque correction amount, which is the first torque correction amount multiplied by the correction coefficient, to the motor torque.

The power determination apparatus 10 operates in this manner, and therefore it is possible to cause the engine 2 to inject the fuel at the corrected injection quantity that is smaller than the fuel injection quantity corresponding to the accelerator opening degree while the vehicle is driven at the acceleration corresponding to the accelerator opening degree. As a result, the valve opening degree of the EGR can be increased, and so the amount of the NOx emissions can be suppressed. Further, the fuel injection quantity can be reduced, and so the amount of PM and HC emissions can also be suppressed.

The invention claimed is:

1. A power determination apparatus comprising:
a processor coupled to a memory storing instructions for the processor to function as:
  a determination part that determines a first injection correction amount of a fuel injection quantity of an engine and a first torque correction amount of motor torque generated by a motor, on a basis of an accelerator opening degree and an engine speed;
  a specification part that specifies a correction coefficient for correcting the first injection correction amount and the first torque correction amount on the basis of i) a difference between an actual boost pressure of a turbocharger and a required boost pressure, which is a boost pressure required for generating torque corresponding to the accelerator opening degree and ii) the engine speed; and
  a calculation part that calculates i) a corrected injection quantity obtained by subtracting a second injection correction amount, which is the first injection correction amount multiplied by the correction coefficient, from the fuel injection quantity and ii) a corrected torque obtained by adding a second torque correction amount, which is the first torque correction amount multiplied by the correction coefficient, to the motor torque, and causes the motor to generate the corrected torque that is larger than the motor torque corresponding to the accelerator opening degree, and cause the engine to inject the fuel at the corrected injection quantity smaller than a fuel injection quantity corresponding to the accelerator opening degree by outputting the calculated corrected injection quantity and corrected torque to a driving control device that controls the motor torque and a fuel injection amount of the engine.

2. The power determination apparatus according to claim 1, wherein
the calculation part calculates the corrected injection quantity that is smaller than the fuel injection quantity corresponding to the accelerator opening degree, and calculates the corrected torque that is larger than the motor torque corresponding to the accelerator opening degree.

3. The power determination apparatus according to claim 1, wherein the processor further function as:
  a valve opening degree determination part that determines a valve opening degree of an EGR device for recirculating exhaust gas of the engine, in accordance with a boost pressure corresponding to the second injection correction amount.

4. The power determination apparatus according to claim 3, wherein
the valve opening degree determination part sets the valve opening degree corresponding to the required boost pressure as a minimum value, and increases the valve opening degree as the second injection correction amount increases.

5. The power determination apparatus according to claim 1, further comprising:
  a storage that stores the first injection correction amount and the first torque correction amount corresponding to the engine speed and the accelerator opening degree, wherein
  the determination part determines the first injection correction amount and the first torque correction amount corresponding to the engine speed and the accelerator opening degree.

6. The power determination apparatus according to claim 5, wherein the processor further function as:
  a receiving part that receives the accelerator opening degree; and
  an acquisition part that acquires the engine speed, wherein
  the storage stores an injection correction map, which is shown as a plane in two-dimensional space having an axis corresponding to the accelerator opening degree and an axis corresponding to the engine speed and shows a plurality of the injection correction amounts associated with the accelerator opening degree and the engine speed, and
  the determination part specifies an injection correction amount associated with the accelerator opening degree received by the receiving part and the engine speed acquired by the acquisition part among the plurality of injection correction amounts included in the injection correction map, and determines the specified injection correction amount as the first injection correction amount.

7. The power determination apparatus according to claim 5, wherein the processor further function as:
  a receiving part that receives the accelerator opening degree; and
  an acquisition part that acquires the engine speed, wherein
  the storage stores a torque correction map, which is shown as a plane in two-dimensional space having an axis corresponding to the accelerator opening degree and an axis corresponding to the engine speed and shows a plurality of the torque correction amounts associated with the accelerator opening degree and the engine speed, and
  the determination part specifies a torque correction amount associated with the accelerator opening degree received by the receiving part and the engine speed acquired by the acquisition part among the plurality of torque correction amounts included in the torque correction map, and determines the specified torque correction amount as the first torque correction amount.

8. The power determination apparatus according to claim 1, further comprising:
  a storage that stores the engine speed and the correction coefficient corresponding to the difference between the actual boost pressure and the required boost pressure, wherein
  the specification part specifies the correction coefficient corresponding to the engine speed and the difference between the actual boost pressure and the required boost pressure.

9. The power determination apparatus according to claim 8, wherein the processor further function as:
  an acquisition part that acquires i) the difference between the actual boost pressure and the required boost pressure and ii) the engine speed, wherein
  the storage stores a correction coefficient map, which is shown as a plane in two-dimensional space having an axis corresponding to the difference between the actual boost pressure and the required boost pressure and an axis corresponding to the engine speed and shows a plurality of the correction coefficients associated with the difference between the actual boost pressure and the required boost pressure and the engine speed, and the specification part specifies a correction coefficient associated with i) the difference between the actual boost pressure and the required boost pressure acquired by the acquisition part and ii) the engine speed, among the plurality of correction coefficients included in the correction coefficient map.

10. The power determination apparatus according to claim 1, wherein the specification part specifies, as the correction coefficients, i) an injection correction coefficient for correcting the first injection correction amount and ii) a torque correction coefficient, different from the injection correction coefficient, for correcting the first torque correction amount, and the calculation part calculates i) a corrected injection quantity obtained by subtracting a second injection correction amount, which is the first injection correction amount multiplied by the injection correction coefficient, from the fuel injection quantity and ii) a corrected torque obtained by adding a second torque correction amount, which is the first torque correction amount multiplied by the torque correction coefficient, to the motor torque.

11. A power determination method comprising:

determining a first injection correction amount of a fuel injection quantity of an engine and a first torque correction amount of motor torque, on a basis of an accelerator opening degree and an engine speed;

specifying a correction coefficient for correcting the first injection correction amount and the first torque correction amount on the basis of i) a difference between an actual boost pressure of a turbocharger and a required boost pressure, which is a boost pressure required for generating torque corresponding to the accelerator opening degree, and ii) the engine speed; and calculating i) a corrected injection quantity obtained by subtracting a second injection correction amount, which is the first injection correction amount multiplied by the correction coefficient, from the fuel injection quantity and ii) a corrected torque obtained by adding a second torque correction amount, which is the first torque correction amount multiplied by the correction coefficient, to the motor torque, and causing a motor to generate the corrected torque that is larger than the motor torque corresponding to the accelerator opening degree, and cause the engine to inject the fuel at the corrected injection quantity smaller than a fuel injection quantity corresponding to the accelerator opening degree by outputting the calculated corrected injection quantity and corrected torque to a driving control device that controls the motor torque and a fuel injection amount of the engine.

* * * * *